(12) United States Patent
Ho (10) Patent No.: US 12,196,362 B2
(45) Date of Patent: Jan. 14, 2025

(54) DISPLAY SYSTEM WITH INTEGRATED ARM AND SPEAKER

(71) Applicant: OXTI Pte Ltd, Singapore (SG)

(72) Inventor: Chih-Feng Ho, Singapore (SG)

(73) Assignee: OXTI PTE LTD, Singapore (SG)

(*) Notice: Subject to any disclaimer, the term of this patent is extended or adjusted under 35 U.S.C. 154(b) by 236 days.

(21) Appl. No.: 18/074,521

(22) Filed: Dec. 5, 2022

(65) Prior Publication Data

US 2024/0183488 A1 Jun. 6, 2024

(51) Int. Cl.
| | | |
|---|---|---|
| *H04R 1/02* | (2006.01) | |
| *F16M 11/04* | (2006.01) | |
| *F16M 11/08* | (2006.01) | |
| *F16M 11/20* | (2006.01) | |
| *F16M 13/02* | (2006.01) | |

(52) U.S. Cl.
CPC ........ *F16M 13/022* (2013.01); *F16M 11/045* (2013.01); *F16M 11/08* (2013.01); *F16M 11/2014* (2013.01); *F16M 11/2085* (2013.01); *H04R 1/02* (2013.01); *H04R 2499/15* (2013.01)

(58) Field of Classification Search
CPC .... H04R 1/02; H04R 2499/15; F16M 13/022; F16M 11/08; F16M 11/2014; F16M 11/2085
See application file for complete search history.

(56) References Cited

U.S. PATENT DOCUMENTS

| | | | | |
|---|---|---|---|---|
| 7,207,537 | B2* | 4/2007 | Hung | F16M 13/02 |
| | | | | 248/920 |
| 2008/0204983 | A1* | 8/2008 | Smejkalova | G06F 1/162 |
| | | | | 361/679.27 |
| 2013/0068916 | A1* | 3/2013 | Mensing | F16M 11/18 |
| | | | | 248/122.1 |
| 2014/0085783 | A1* | 3/2014 | Li | G06F 1/166 |
| | | | | 361/679.01 |
| 2020/0229894 | A1* | 7/2020 | Chang | A61B 90/37 |
| 2021/0247019 | A1* | 8/2021 | Newville | F16M 13/02 |
| 2022/0107669 | A1* | 4/2022 | Emam | G06F 1/1656 |

* cited by examiner

*Primary Examiner* — David L Ton
(74) *Attorney, Agent, or Firm* — Leong C. Lei (57) ABSTRACT

The display system includes an audio output device configured with a first sliding trough, a display configured with a second sliding trough, and an arm having a first end and a second end. A first bolt is configured at the first end, and a second bolt is configured at the second end. The first bolt is slidably embedded in the first sliding trough and the second bolt is slidably joined to the second sliding trough. The arm includes a number of segments and at least one pivot. The segments are end-to-end joined by the at least one pivot so that the segments selectively rotate relative to each other. The display system may adjust the relative positions of the display and the audio output device. The display may also turn horizontally, tilt vertically, or move laterally, greatly enhancing its operation convenience.

5 Claims, 8 Drawing Sheets

DISPLAY SYSTEM WITH INTEGRATED ARM AND SPEAKER

BACKGROUND OF THE INVENTION (a) Technical Field of the Invention

The present invention is generally related to displays, and more particular to a display system integrating a display, a mount, and a speaker.

(b) Description of the Prior Art

Monitor or screen mounts not only provide support to a monitor or screen, but also allow the monitor or screen to change direction or orientation through a number of joined arms.

For example, People's Republic of China Patent No. CN2599374Y, titled Screen Multidirectional Adjuster, teaches such a device. According to its FIG. 3, the device has a vertical pole and an axle telescoped in the vertical pole that may move vertically up and own. A top end of the axle is pin-joined to a rotary seat which rotates horizontally left and right. The rotary seat in turn is pin-joined to a pivot seat. The pivot seat the pivots a panel where a display is mounted. The display then may adjust its height by moving up and down (as shown in FIG. 5), its direction by turning to left or right (as shown in FIG. 6) or upward or downward (as shown in FIG. 4), or its orientation by tilting to a side (as shown in FIG. 7).

For such a teaching, except that the display may have an adjustable height, the display basically remains at a same location. In other words, the display has to be used at a fixed location, leading to some inconvenience in installation and usage. For example, it may be difficult to adjust the display when there is a tight space with reflection issue. Furthermore, unless the display has a built-in speaker, which usually has an inferior sound quality, an independent speaker also requires a space for installation.

SUMMARY OF THE INVENTION

To resolve the above shortcomings of the prior art, the present invention provides a display system including an audio output device configured with a first sliding trough, a display configured with a second sliding trough, and an arm having a first end and a second end. A first bolt is configured at the first end, and a second bolt is configured at the second end. The first bolt is slidably embedded in the first sliding trough and the second bolt is slidably joined to the second sliding trough. The arm includes a number of segments and at least one pivot. The segments are end-to-end joined by the at least one pivot so that the segments selectively rotate relative to each other.

Specifically, the audio output device is a speaker, and the first sliding trough is configured along a side of the audio output device.

Specifically, the audio output device is configured with at least one fastener.

Specifically, the display is a computer display, or a touch-sensitive display of a tablet computer or a smart phone. The second sliding trough is configured along a side of the display.

Specifically, a pin is extended from the second bolt; and the pin is slidably embedded in the second sliding trough.

The present invention, through having the first bolt slidably in the first sliding trough, the pin slidably in the second sliding trough, and the segments pivotally end-to-end joined together, may adjust the relative positions of the display and the audio output device. The display may also turn horizontally, tilt vertically, or move laterally, greatly enhancing its operation convenience. In addition, the audio output device may be fastened to a wall or a ceiling, as well as to a desktop, through the fasteners.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
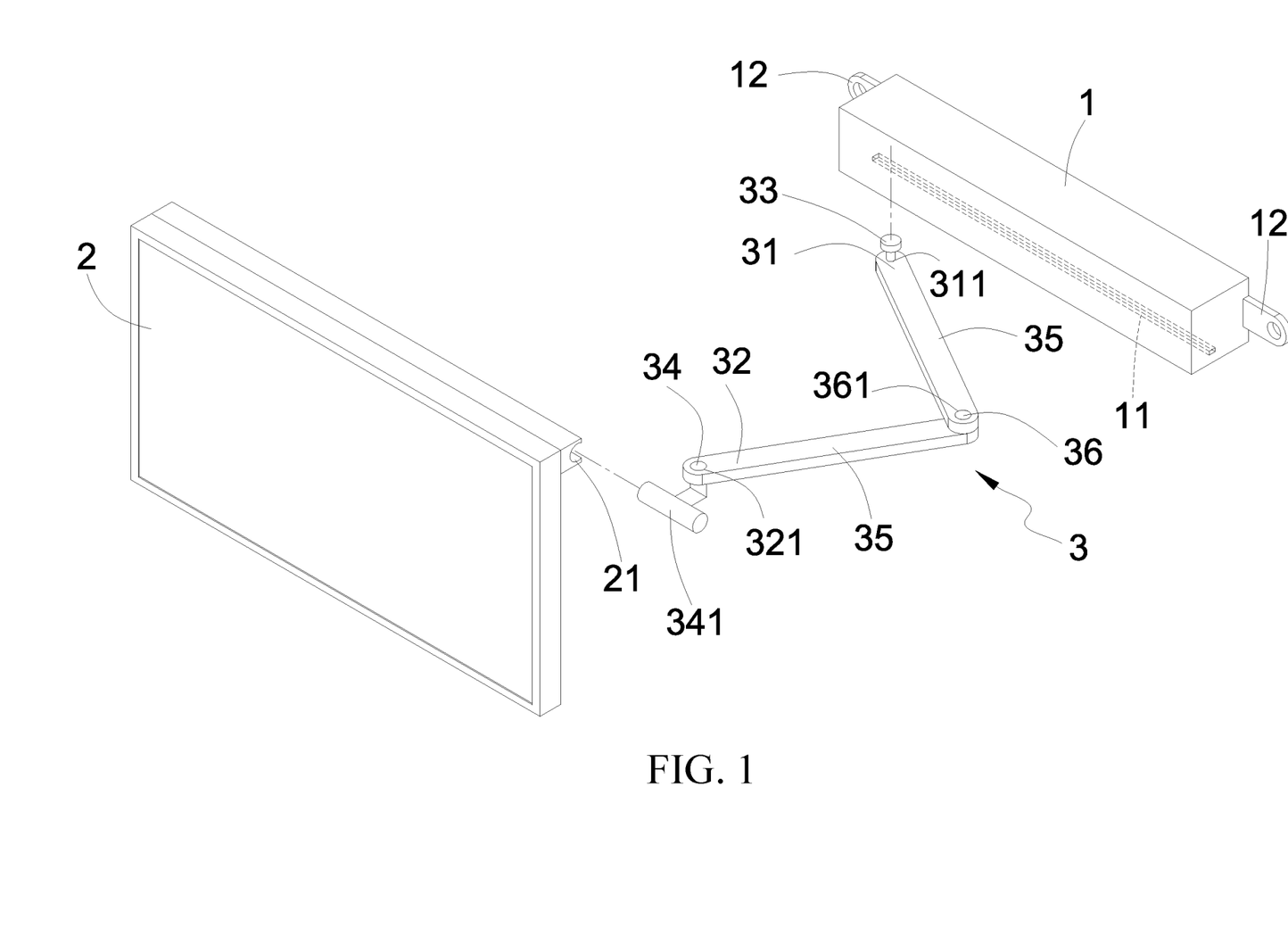
FIG. 1 is a perspective break-down diagram showing a display system according to an embodiment of the present invention.
Figure 2:
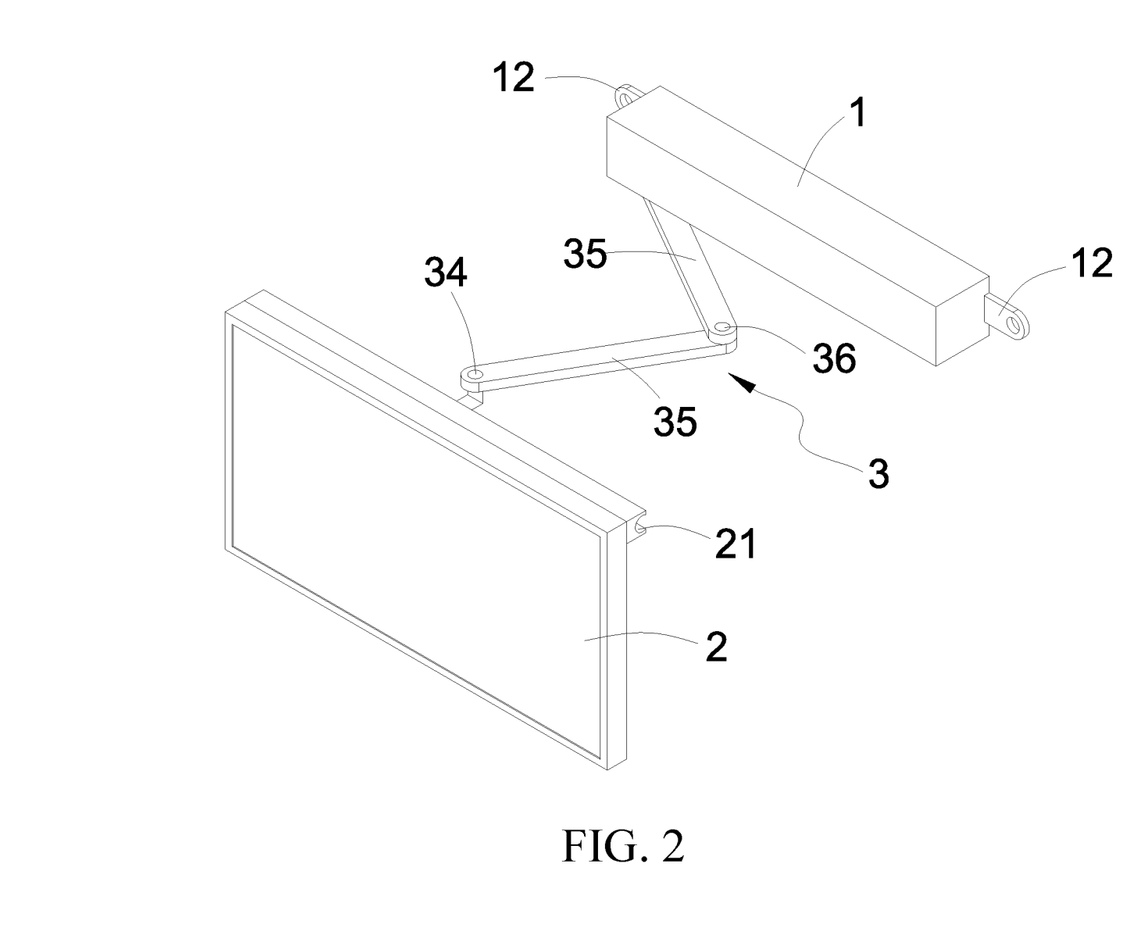
FIG. 2 is a perspective diagram showing the display system of FIG. 1 after assembly.

As shown in FIGS. 1 and 2, the present invention teaches a display system, which includes an audio output device 1, a display 2, and an arm 3.

The audio output device 1 is configured with a first sliding trough 11 along a side of the audio output device 1. The audio output device 1 may be a speaker. The audio output device 1 is also configured with fasteners 12. The audio output device 1 is fixed to a desktop, a wall, or a ceiling through the fasteners 12. However, the present invention is not limited to such places.

The display 2 is configured with a second sliding trough 21 along a side of the display 2. The display 2 may be a computer display, or a touch-sensitive display of a tablet computer or a smart phone.

The arm 3 has a first end 31 and a second end 32. A first bolt 33 is configured at the first end 31. A second bolt 34 is configured at the second end 32. The first bolt 33 is slidably embedded in the first sliding trough 11. The second bolt 34 is slidably joined to the second sliding trough 21. The arm 3 includes a number of segments 35 and at least a pivot 36. The segments 35 are end-to-end joined by the pivots 36 so that the segments 35 may rotate relative to each other. A pin 341 is extended from the second bolt 34 and the pin 341 is slidably embedded in the second sliding trough 21.

The first end 31 of the arm 3 has a first bolt hole 311. The first bolt 33 has a diameter slightly larger than that of the first bolt hole 311 so that the first bolt 33 is tightly fitted through the first bolt hole 311. Similarly, the first bolt 33 is also tightly fitted in the first sliding trough 11. As such, the first bolt 33 remains static relative to the first bolt hole 311 and the first sliding trough 11 unless an external force of a certain magnitude is applied.

The second end 32 of the arm 3 has a second bolt hole 321. The second bolt 34 has a diameter slightly larger than that of the second bolt hole 321 so that the second bolt 34 is tightly fitted through the second bolt hole 321. The second bolt 34, in contrast to the first bolt 33, is extended with a pin 341 slidably embedded in the second sliding trough 21. The pin 341 has a diameter slightly larger than that of the second sliding trough 21 so that the pin 341 is tightly fitted in the second sliding trough 21. As such, the second bolt 34 remains static in the second bolt hole 321, and the pin 341 remains static in the second sliding trough 21 unless an external force of a certain magnitude is applied.

Each segment 35 has a pivot hole 361 at an end for pin-joining with a next segment 35 with a pivot 36. The pivot 36 has a diameter slightly larger than that of pivot hole 361 so that the pivot 36 is tightly fitted in the pivot hole 361. As such, the pivot 36 remains static in the pivot hole 361 unless an external force of a certain magnitude is applied.

Figure 3:
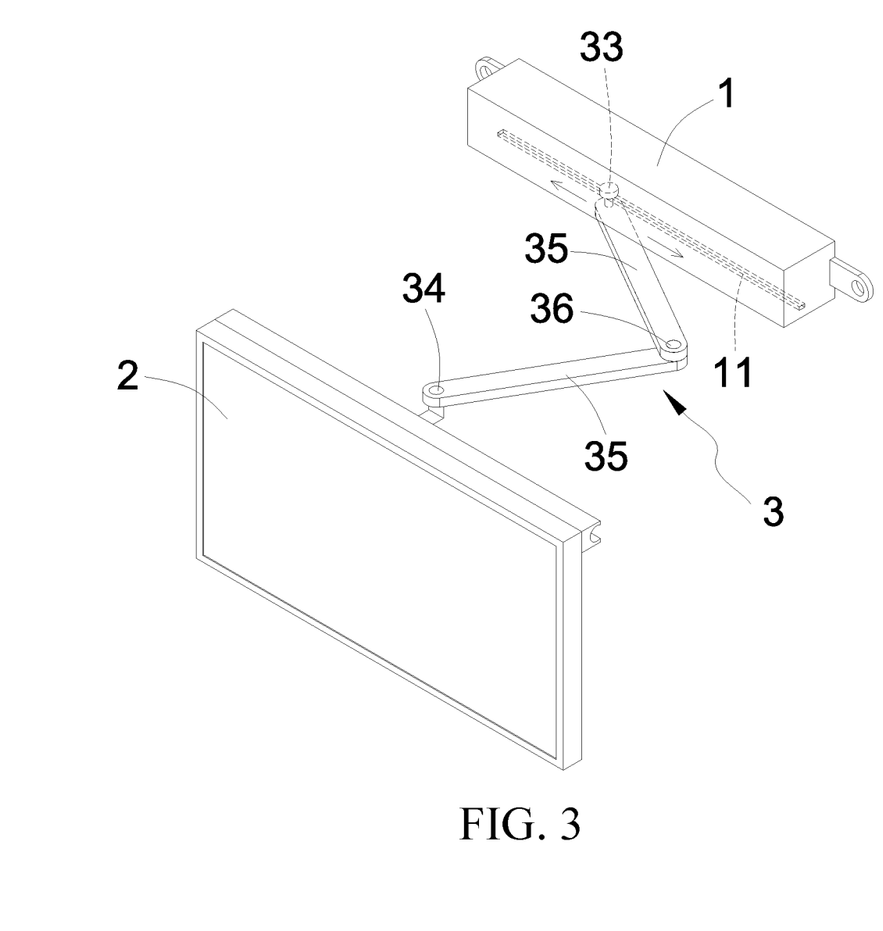
FIG. 3 is a perspective diagram showing an arm segment sliding in a first sliding trough of the display system of FIG. 1.

As shown in FIG. 3, by exerting an external force of a certain magnitude to the first bolt 33, the first bolt 33 may slide in the first sliding trough 11 so to adjust the position of the display 2 relative to the audio output device 1.

Figure 4:
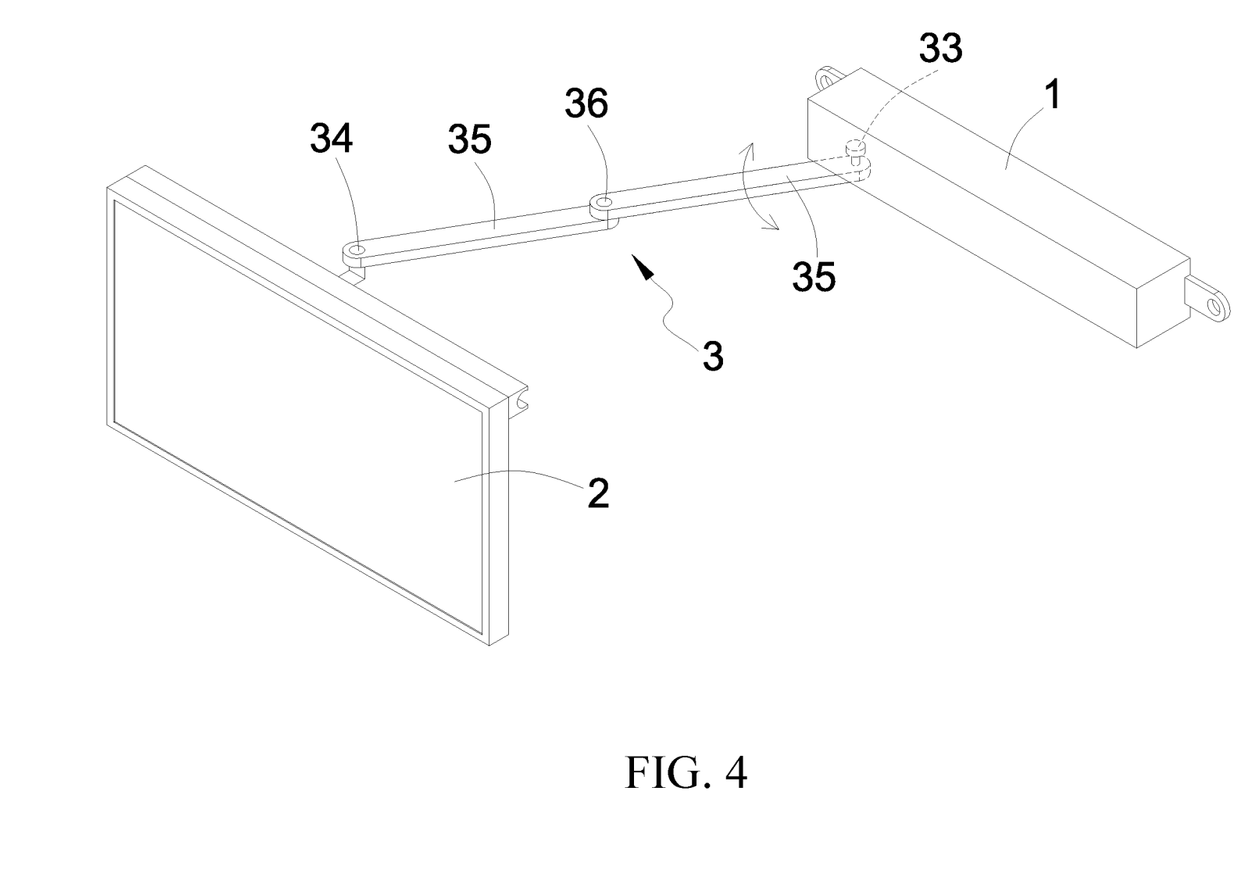
FIG. 4 is a perspective diagram showing the arm segments of the display system of FIG. 1 in a fully extended configuration.
Figure 5:
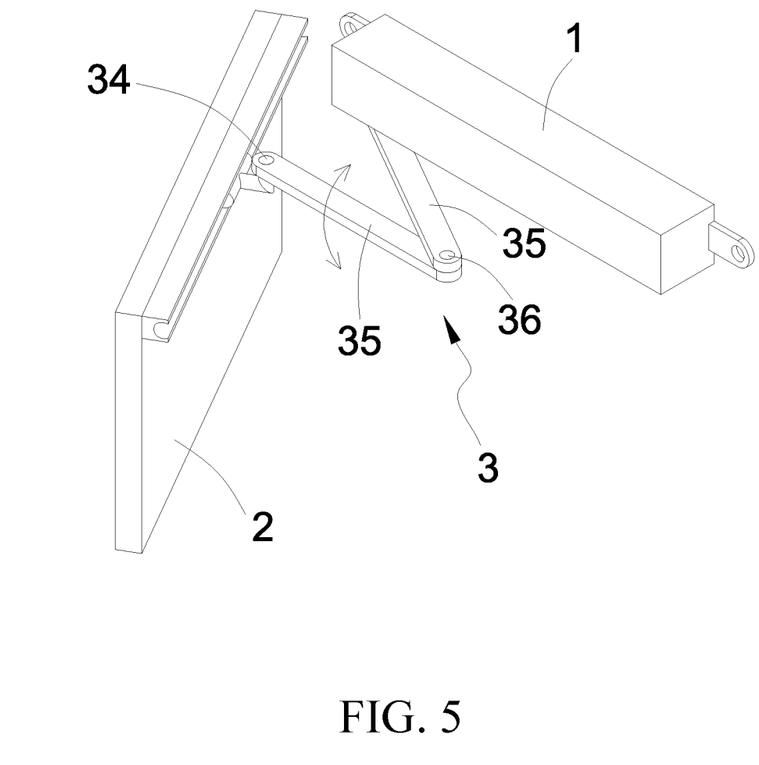
FIG. 5 is a perspective diagram showing the arm segments of the display system of FIG. 1 in a folded configuration.

As shown in FIGS. 4 and 5, by exerting an external force of a certain magnitude to the segments 35, the segments 35 may pivot around the pivots 36 so that the arm 3 is extended or folded. FIG. 4 shows that the arm 3 is in an extended configuration, whereas FIG. 5 shows that the arm 3 is in a folded configuration.

Figure 6:
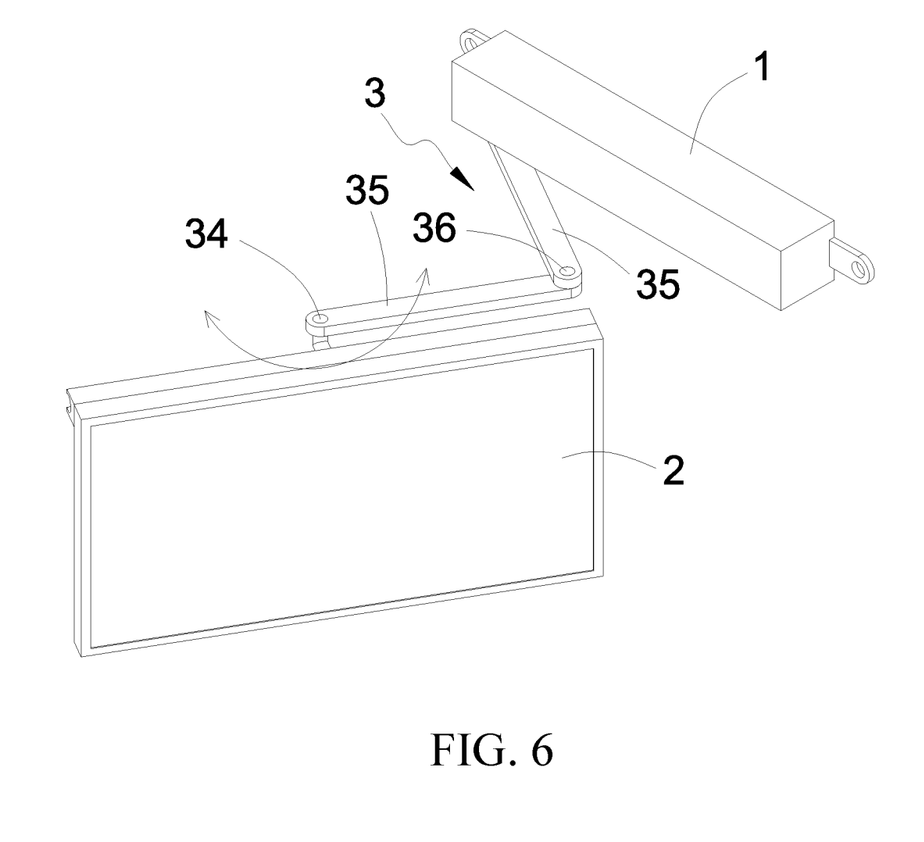
FIG. 6 is a perspective diagram showing the display of the display system of FIG. 1 turned to face a specific direction.

As shown in FIG. 6, by exerting an external force of a certain magnitude to the display 2, the display 2 may turn horizontally relative to the arm 3.

Figure 7:
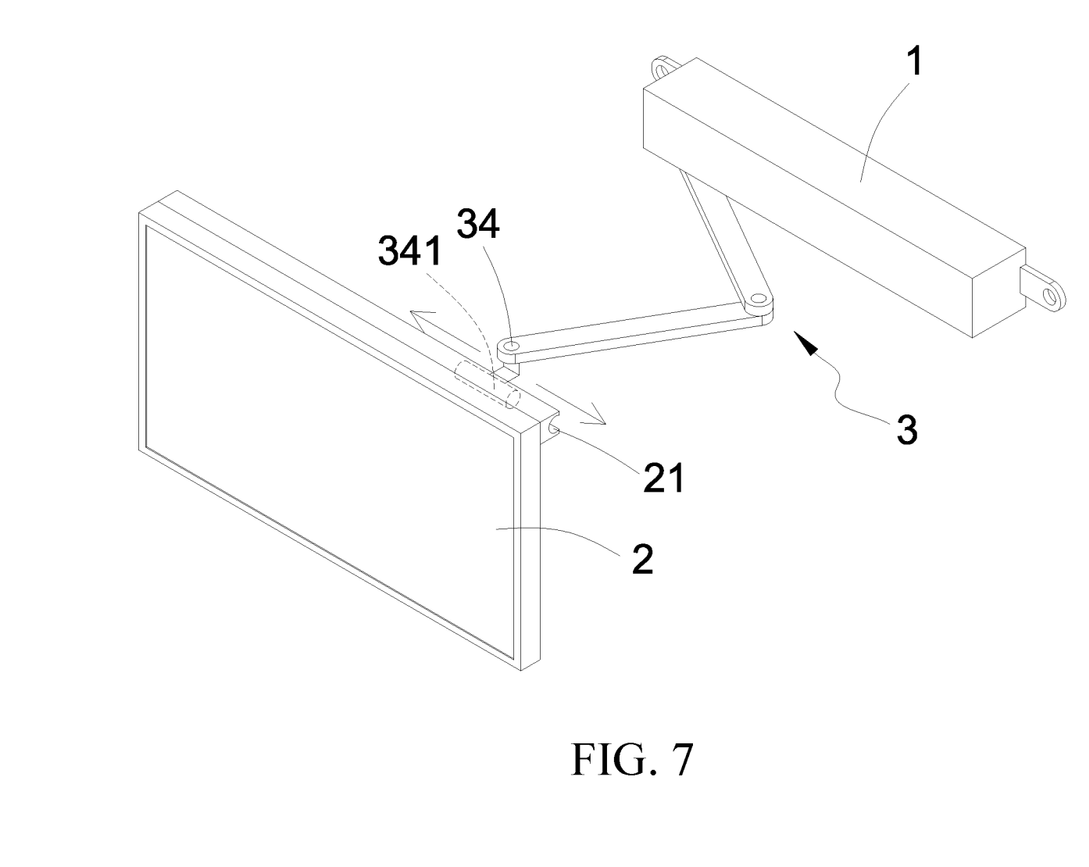
FIG. 7 is a perspective diagram showing an arm sliding in a second sliding trough of the display system of FIG. 1.

As shown in FIG. 7, by exerting an external force of a certain magnitude to the display 2, the pin 341 of the second bolt 34 may slide in the second sliding trough 21 so to adjust the display 2's horizontal position.

Figure 8:
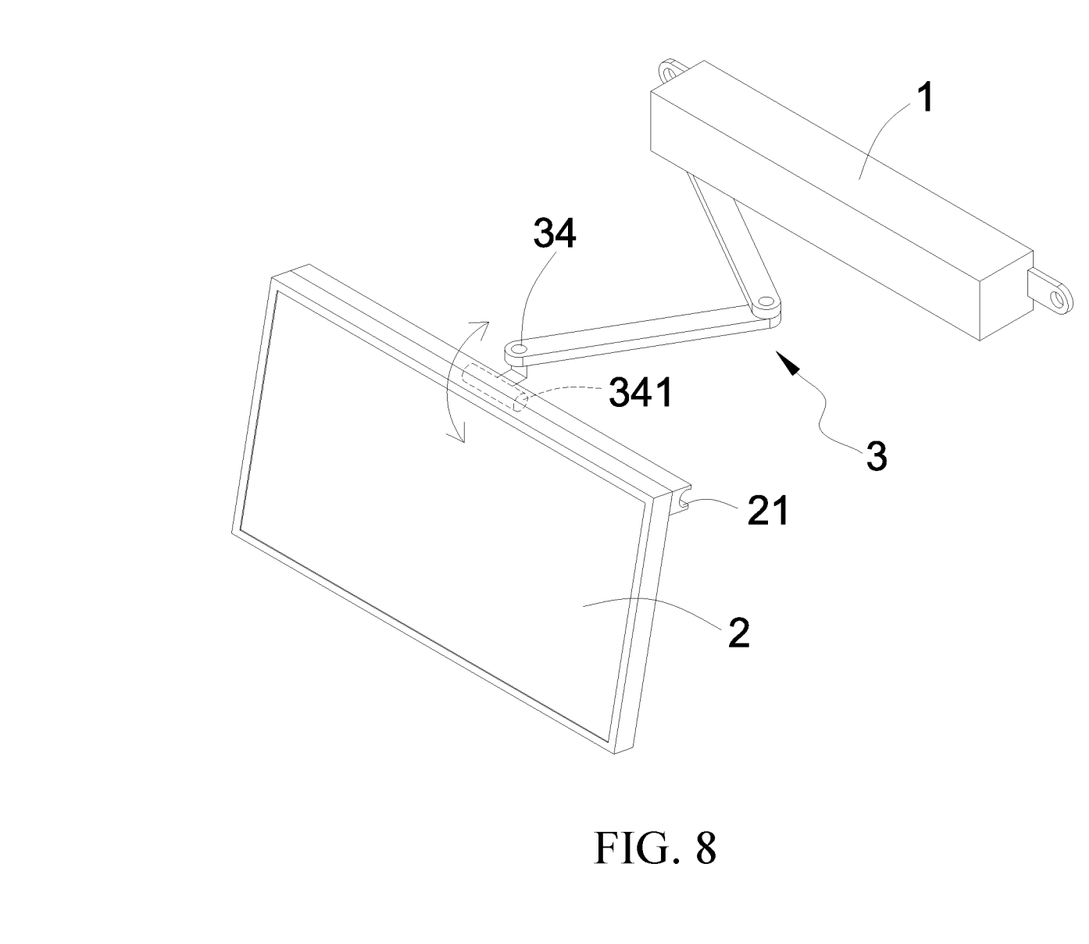
FIG. 8 is a perspective diagram showing the display of the display system of FIG. 1 tilted to face a specific direction.

As shown in FIG. 8, by exerting an external force of a certain magnitude to the display 2, the display 2 may tilt upward or downward as the pin 341 of the second bolt 34 rotates inside the second sliding trough 21.

As described above, through having the first bolt 33 slidably in the first sliding trough 11, the pin 341 slidably in the second sliding trough 21, and the segments 35 pivotally end-to-end joined together, the relative positions of the display 2 and the audio output device 1 may be adjusted. The display 2 may also turn horizontally, tilt vertically, or move laterally, greatly enhancing its operation convenience. In addition, the audio output device 1 may be fastened to a wall or a ceiling, as well as to a desktop, through the fasteners 12. Furthermore, by integrating the audio output device 1 into the display system of the present invention, there is no need to separately reserve space for the installation of the audio output device 1.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A display system, comprising:
   an audio output device configured with a first sliding trough;
   a display configured with a second sliding trough; and
   an arm having a first end and a second end, where a first bolt is configured at the first end, a second bolt is configured at the second end, the first bolt is slidably embedded in the first sliding trough, the second bolt is slidably joined to the second sliding trough, the arm comprises a plurality of segments and at least one pivot, the segments are end-to-end joined by the at least one pivot so that the segments selectively rotate relative to each other.

2. The display system according to claim 1, wherein the audio output device is a speaker; and the first sliding trough is configured along a side of the audio output device.

3. The display system according to claim 1, wherein the audio output device is configured with at least one fastener.

4. The display system according to claim 1, wherein the display is a computer display, or a touch-sensitive display of a tablet computer or a smart phone; and the second sliding trough is configured along a side of the display.

5. The display system according to claim 1, wherein a pin is extended from the second bolt; and the pin is slidably embedded in the second sliding trough.

* * * * *